United States Patent [19]

Sayles

[11] Patent Number: 4,810,359

[45] Date of Patent: Mar. 7, 1989

[54] GAS-LIQUID SEPARATION IN AN EBULLATED BED PROCESS

[75] Inventor: Scott M. Sayles, Port Neches, Tex.

[73] Assignee: Texaco Inc., White Plains, N.Y.

[21] Appl. No.: 897,233

[22] Filed: Aug. 18, 1986

[51] Int. Cl.$^4$ .......................... C10G 1/08; C10G 23/00
[52] U.S. Cl. ...................................... 208/143; 208/146
[58] Field of Search .............. 208/143, 146, 147, 148, 208/157

[56] References Cited

U.S. PATENT DOCUMENTS

| | | | |
|---|---|---|---|
| Re. 25,770 | 4/1965 | Johansen | 208/143 |
| 2,990,237 | 6/1961 | Bowles et al. | 208/146 X |
| 3,124,518 | 3/1964 | Guzman et al. | 208/143 X |
| 3,188,286 | 6/1965 | Driesen | 208/143 X |
| 3,398,085 | 8/1968 | Engle | 208/143 X |
| 3,668,116 | 6/1972 | Adams et al. | 208/216 |
| 3,677,716 | 7/1972 | Weber et al. | 23/288 |
| 3,698,876 | 10/1972 | Gregoli et al. | 208/143 X |
| 4,151,073 | 4/1979 | Comolli | 208/340 |
| 4,211,653 | 9/1980 | Chervenak et al. | 208/81 E |
| 4,354,852 | 10/1982 | Kydd | 23/230 A |

OTHER PUBLICATIONS

API Manual of Refinery Wastes, vol. Atmospheric Emissions, Chapter 11, May 1975 (API Pub. 931).

*Primary Examiner*—Glenn Caldarola
*Attorney, Agent, or Firm*—Jack H. Park; Kenneth R. Priem; Richard A. Morgan

[57] ABSTRACT

In an ebullated bed process it has been found that a hydroclone effectively removes gas from recycled liquid used to ebullate the catalyst bed. When a 5 psi or greater inlet head and 5 psi pressure drop from the hydrocyclone inlet to the liquid outlet is maintained, essentially all gas is removed form the recycled liquid. Stabilized recycle pump operation is experienced and steady state achieved thereby.

1 Claim, 5 Drawing Sheets

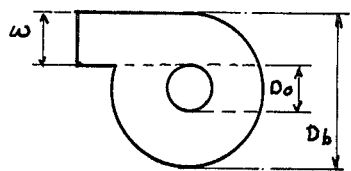
FIGURE 3b
FIGURE 3a
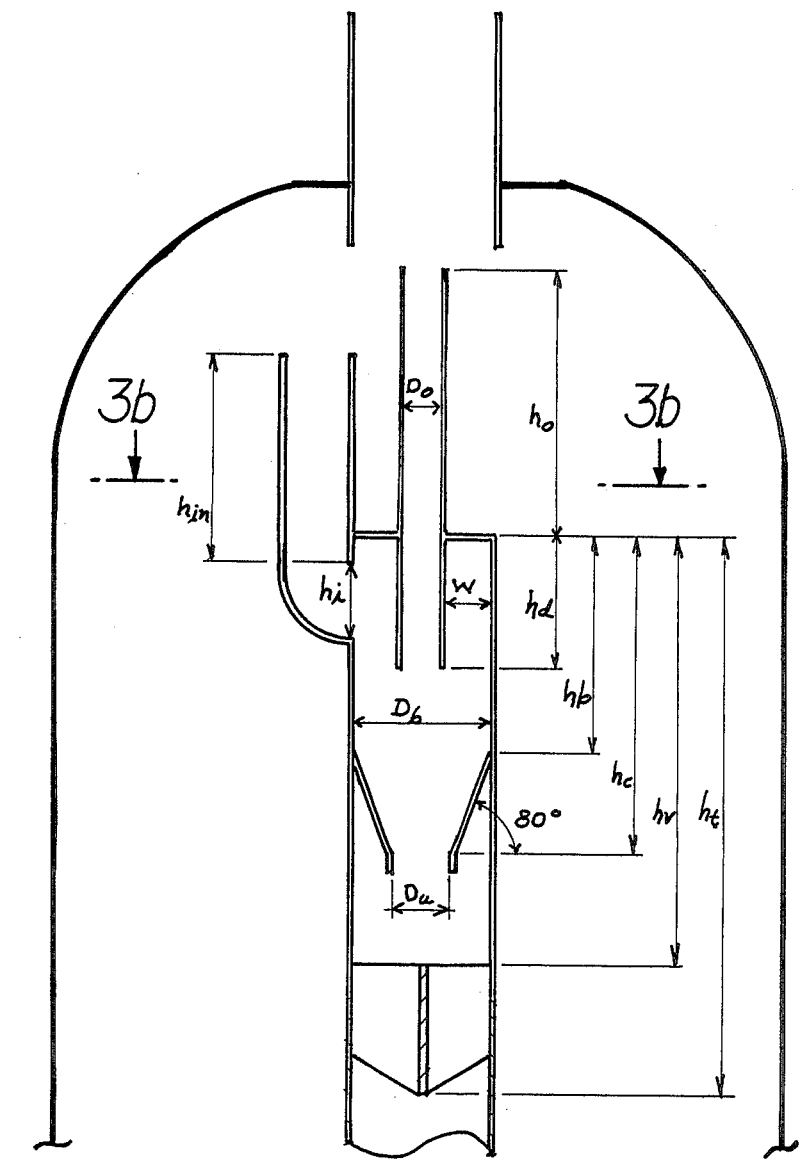

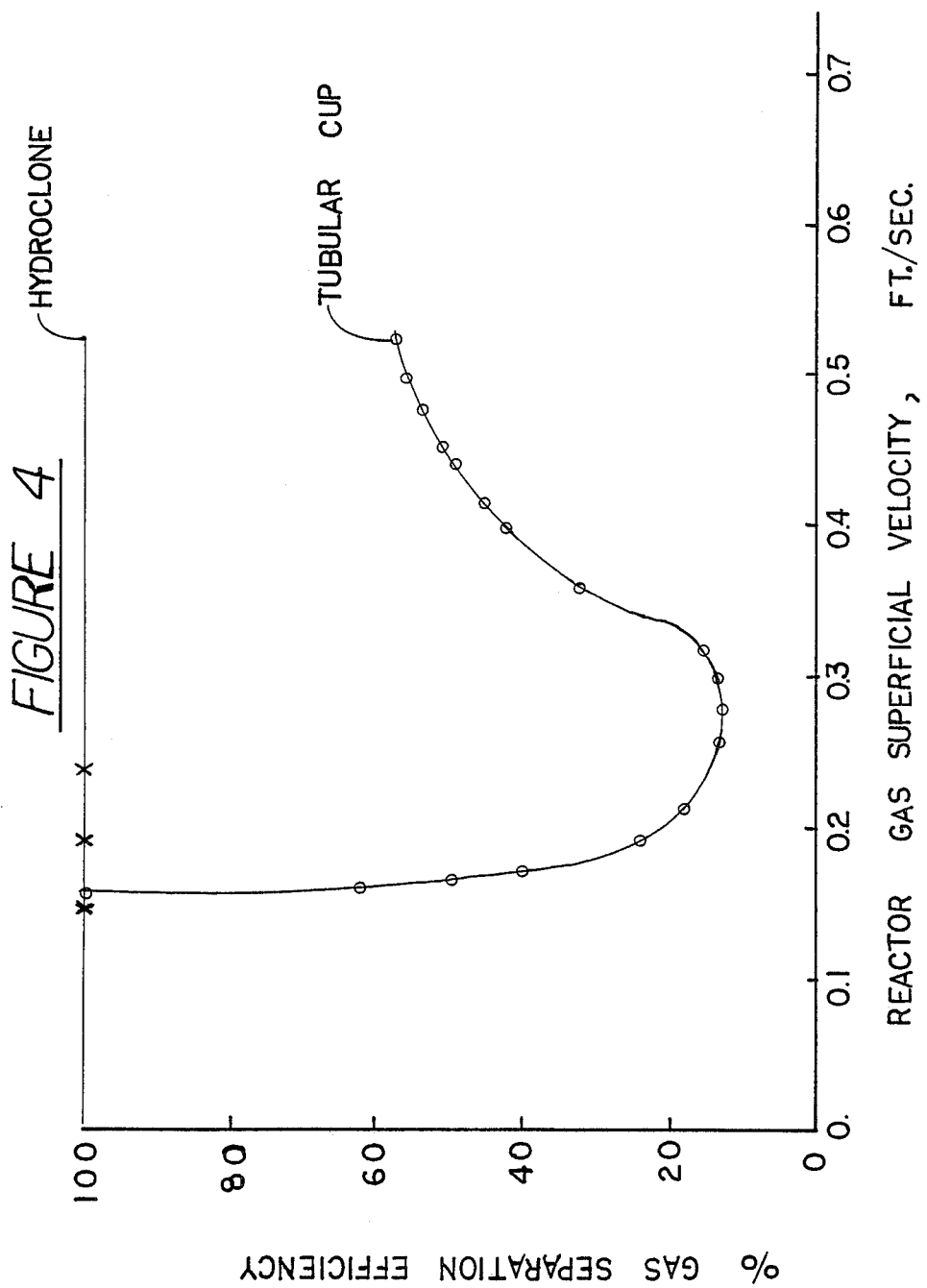

GAS-LIQUID SEPARATION IN AN EBULLATED BED PROCESS

BACKGROUND OF THE INVENTION

1. Field of the invention

This invention relates to an improvement in gas-liquid phase separation in an ebullated bed process. Specifically, the invention relates to the use of a hydroclone to separate gas from hot, high pressure recycle liquid thereby reducing recycle pump cavitation, preventing ebullated bed collapse.

2. Description of Other Relevant Methods in the Field

The ebullated bed process comprises passing concurrently flowing streams of liquids or slurries of liquids and solids and gas through a vertically cylindrical vessel which contains catalyst. The mass of catalyst is placed in random motion in the liquid medium, and has a gross volume dispersed through the liquid medium greater than the volume of the mass when stationary. This technology has found commercial application in the upgrading of heavy liquid hydrocarbons or converting coal to synthetic oils.

The process is generally described in U.S. Pat. No. Re 25,770 to Johanson incorporated herein by reference. A mixture of hydrocarbon liquid and hydrogen is passed upwardly through a bed of catalyst particles at a rate such that the particles are forced into random motion as the liquid and gas pass upwardly through the bed. The catalyst bed motion is controlled by a recycle liquid flow so that the catalyst particles do not rise above a definable level in the reactor. Vapors along with the liquid which is being hydrogenated pass through that upper level of catalyst particles into a substantially catalyst free zone and are removed at the upper portion of the reactor.

In an ebullated bed process substantial amounts of hydrogen gas and light hydrocarbon vapors are present which rise through the reaction zone into the catalyst free zone. Liquid is both recycled to the bottom of the reactor and removed from the reactor as product from this catalyst free zone. Vapor is separated from the liquid recycle stream before being passed to the recycle pump suction. The recycle pump (ebullating pump) maintains the expansion (ebullation) and random motion of catalyst particles at a constant and stable level. Gases or vapors present in the recycled liquid materially decrease the capacity of the recycle pump as well as alter the flow pattern within the reactor, thus decreasing stability of the ebullated bed.

Reactors employed in a catalytic hydrogenation process with an ebullated bed of catalyst particles are designed with a central vertical conduit which serves as the downcomer for recycling clear liquid from the catalyst free zone above the ebullated catalyst bed to the suction of a recycle pump to recirculate the liquid through the catalytic reaction zone. The recycling of liquid from the upper portion of the reactor serves to ebullate the catalyst bed thereby maintaining uniform temperature through the reactor and stabilizing the catalyst bed.

U.S. Pat. No. 4,221,653 to Chervenak et al. describes a separator apparatus for separating vapor from liquid in an ebullated bed process. The apparatus comprises a frusto-conical cup in which are inserted a plurality of conduits. The conduits are positioned so that higher conduits carry gas-rich fluid and lower conduits carry liquid-rich fluid. The separator apparatus of the Chervenak et al. patent and those like it with a plurality of conduits are referred to as a tubular cup. The generic term for the recycle gas-liquid separator apparatus in an ebullating bed process is recycle cup.

It is a critical feature of the tubular cup that the upflowing liquid-gas mixture rising from the reaction zone passes through the fluid intake conduits of the separation apparatus and that all conduits are below the reactor liquid level. After passage through the separation apparatus, the gas portion rises to the space above the phase separation zone. Part of the liquid portion is returned through a downcomer conduit and recycled to the reaction zone, while the remaining liquid portion is withdrawn from the reactor as liquid product. The returned part of the liquid portion passes through the downcomer to a recirculating pump, then passes through a liquid-gas distributor means, together with fresh liquid and gas feed to maintain uniform upward fluid flow through the ebullated catalyst bed. The liquid and vapor effluent may be withdrawn separately from the upper portion of the reactor. In this case a second interface between liquid and vapor is established. Vapor is drawn from above the interface. If desired, liquid and vapor portions may be withdrawn together through a single conduit extending into the reactor to a point above the separator apparatus in the essentially solids free zone.

U.S. Pat. No. 3,677,716 to Weber et al. discloses an enclosed gas-liquid disengaging apparatus used in an ebullated bed process. The patent is most significant for its teaching that cyclones were tested and found to withdraw catalyst from the ebullated bed.

The design of cyclone separators such as those particularly adapted to the separation of vapors or solids from liquids, known as hydrocyclones or hydroclones is well known in the art. Examples of these design methods include *API Manual of Refinery Wastes*, Vol. Atmospheric Emissions, Chapter 11, May 1975 (API Pub. 931); *Hydroclones: Dimensions and Performance* by Zanker, Chemical Engineering, May 9, 1977 and U.S. Pat. No. 4,544,486.

There is a need for an effective means of separating gas from recycled liquid in an ebullated bed process, thereby increasing steady state operating time.

BRIEF DESCRIPTION OF THE DRAWINGS

FIG. 3a is an example of the dimensions of a typical hydroclone assembly in a side view. FIG. 3b is an overhead view.

FIG. 4 is a plot of data comparing the separation efficiency of a tubular cup and a hydroclone under the conditions of an ebullated bed process.

DETAILED DESCRIPTION OF THE DRAWINGS

In order to demonstrate and provide a better understanding of the invention, reference is made to the drawings.

Figure 1:
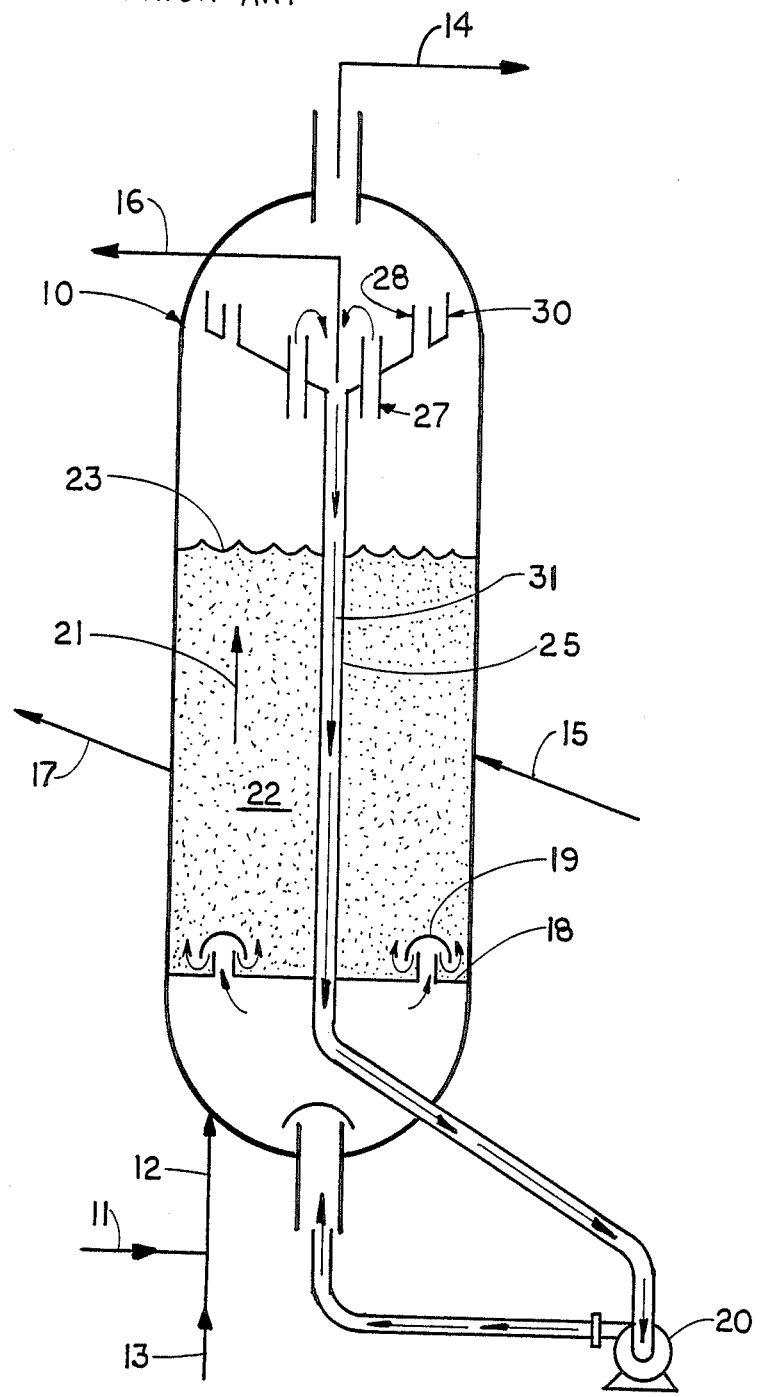
FIG. 1 is a sectional elevated view of a reaction vessel containing a tubular cup vapor-liquid separation apparatus.

Reference is made to FIG. 1. Reaction vessel 10 is positioned with its long axis in a vertical position and is generally of a circular cross section. Although this FIG. 1 drawing is schematic in order to show its various features, it is understood that the reactor is constructed in such a fashion and from such materials that it is suitable for reacting liquids, liquid-solid slurries, solids and gases at elevated temperatures and pressures and in a preferred embodiment for treating hydrocarbon liquids with hydrogen at high pressures and high temperatures, e.g. 100–5000 psi and 300° to 1000° F. The reactor 10 is fitted with a suitable inlet conduit 12 for feeding heavy oil and a hydrogen-containing gas. Outlet conduits are located in the upper portion of reactor 10, outlet conduit 14 being designed to withdraw vapor and liquid, and optionally outlet conduit 16 to withdraw mainly liquid product, if desired. The reactor also contains means for introducing and withdrawing catalyst particles, which are shown schematically as inlet conduit 15 and outlet conduit 17.

Heavy oil feedstock is introduced through conduit 11, while hydrogen-containing gas is introduced through conduit 13, and may be combined with the feedstock and fed into reactor 10 through inlet conduit 12 in the bottom of the reactor. The incoming fluid passes through grid tray 18 containing suitable fluid distribution means. In this drawing, bubble caps 19 are shown as the fluid distribution means, but it is to be understood that any suitable device known in the art which will uniformly distribute the fluid coming from inlet conduit 12 over the entire cross-sectional area of reactor 10 may be utilized.

The mixture of liquid and gas flows upwardly, and the catalyst particles are thereby forced into an ebullated movement by the gas flow and the liquid flow delivered by recycle pump 20 which may be either internal or external to the reactor 10. The upward liquid flow delivered by this recycle pump is sufficient to cause the mass of catalyst particles in bed 22 to expand by a volume at least 10% and usually by 20% to 200% greater than the static volume, thus permitting gas and liquid flow as shown by directional arrow 21 through reactor 10. Due to the upwardly directed flow provided by the pump and the downward force provided by gravity, the catalyst bed particles reach an upward level of travel or ebullation while the lighter liquid and gas continue to move upward beyond that level. In this drawing, the upper catalyst or catalyst-liquid interface is shown as level 23, and the catalytic reaction zone extends from grid tray 18 to level 23. Catalyst particles in bed 22 in this reaction zone move randomly and are uniformly distributed through this entire zone in reactor 10.

Essentially no catalyst particles rise above catalyst level 23. The volume above the catalyst level 23 is filled with liquid and entrained gas or vapor. Gas is separated from liquid in the recycle cup 30 to collect and recycle a liquid with a substantially reduced gas and vapor content through downcomer 25. A substantially liquid product may be withdrawn separately from gas and vapor through outlet conduit 16, in which event outlet conduit 14 withdraws vapor alone from a vapor space, not shown. Alternatively gases, vapors, and liquids may be withdrawn together.

The upper portion of downcomer 25 is the recycle cup 30, in this drawing a tubular cup comprising tubes or conduits. A plurality of vertically directed conduits 27 and 28 providing fluid communication between the reaction zone and recycle cup 30. Gas-entrained fluid moves upwardly through the conduits 27 and 28, and upon leaving the upper ends of these conduits, a portion of the liquid reverses direction and flows downward to and through downcomer 25 in the direction of arrow 31 to the inlet of recycle pump 20 and thereby is recycled through the lower portion of reactor 10 below grid tray 18. Gases and vapors which are separated from the liquid, rise to collect in the upper portion of reactor 10 and are removed along with the remaining liquid through outlet conduit 14. The gases, vapors and liquids removed at this point are treated by conventional means to recover as much hydrogen as possible for recycle through conduit 13.

Figure 2:
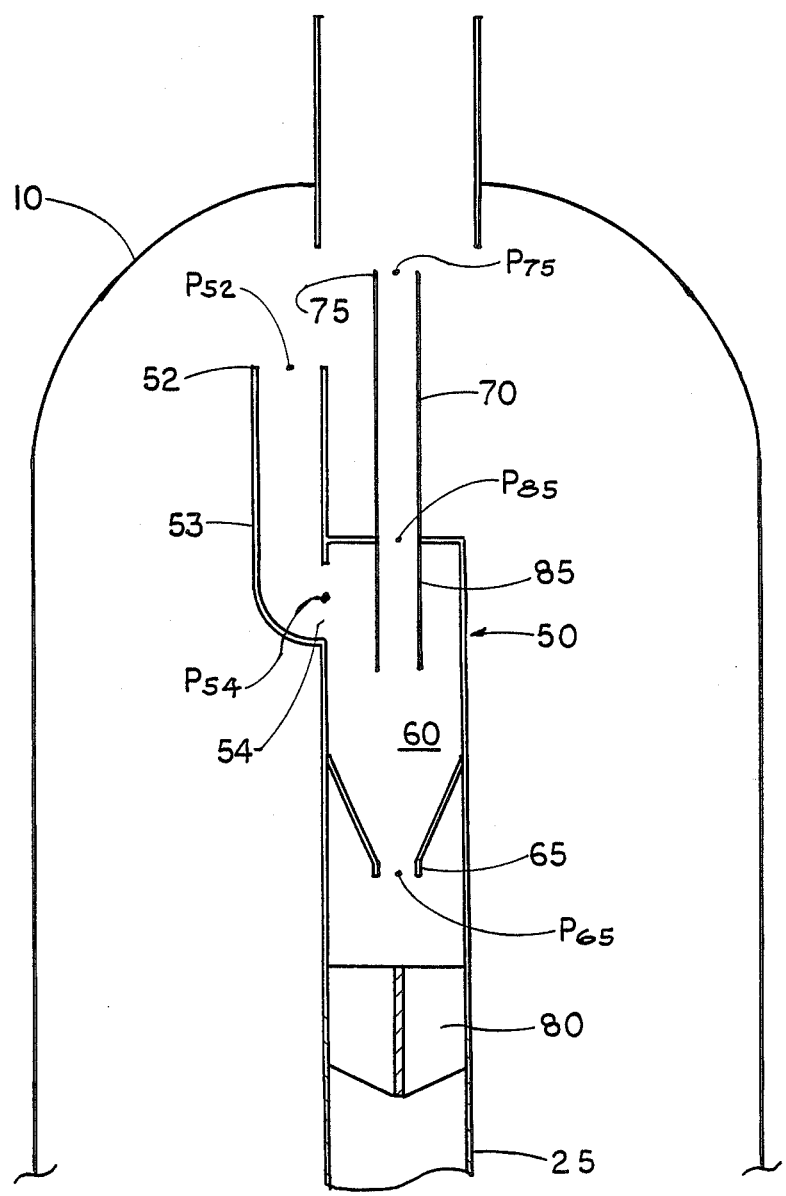
FIG. 2 is an ebullated bed system comprising a hydroclone for vapor liquid separation.

Reference is made to FIG. 2.

The upper portion of downcomer 25 is a hydroclone 50. Fluid consisting of hydrocarbon liquid and vapor and substantially free of catalyst flows at inlet pressure $P_{52}$ into the inlet 52 of feed conduit 53 and on to the separation chamber 60 through separation chamber inlet 54 at separation chamber inlet pressure $P_{54}$. Feed conduit 53 is of a length ($h_{in}$ in FIG. 3a) to maintain a static head ($P_{54}-P_{52}$) of at least 5 psi. The separation chamber 60 is designed at operating conditions to have a pressure drop ($P_{65}-P_{54}$) of at least 5 psi between the separation chamber inlet 54 and the liquid outlet 65 at liquid outlet pressure $P_{65}$. Vapor free liquid via liquid outlet 65, passes through vortex breaker 80 in downcomer 25. Though not essential, the use of a vortex breaker 80 in combination with the hydroclone 50 eliminates any entrainment and is the best mode contemplated by applicant for carrying out the invention. Vapor leaves the separation chamber 60 via draft tube 85 (at draft tube pressure $P_{85}$) and conduit 70 and exits via vapor outlet 75 at vapor outlet pressure $P_{75}$.

Figure 5:
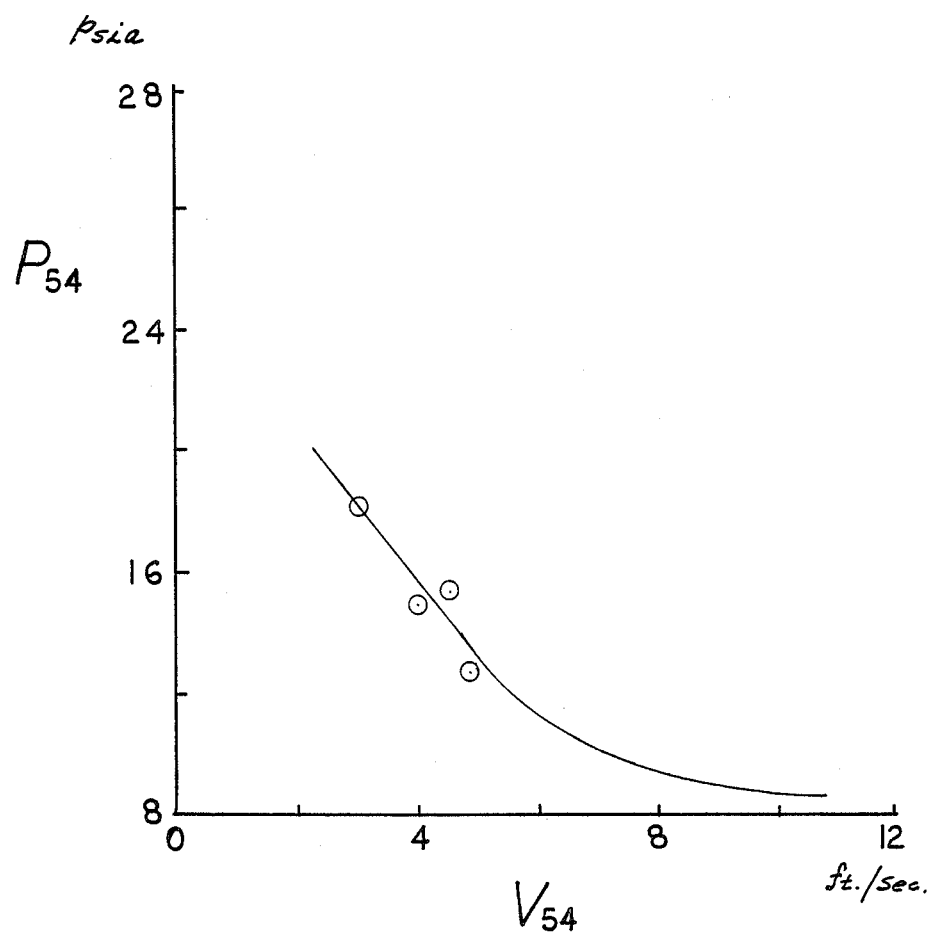
FIG. 5 is a plot of data of hydroclone liquid outlet pressure and velocity.

FIGS. 3, 4 and 5 are discussed in the Examples.

SUMMARY OF THE INVENTION

The invention is an improvement in a continuous process for treating fluid hydrocarbon feedstocks with a hydrogen-containing gas at elevated temperatures in the presence of a bed of particulate solid catalyst the process referred to in the art as an ebullated bed process. In the ebullated bed process, hydrogen containing gas and feedstock are introduced into the lower end of a generally vertical catalyst containing vessel. They are introduced at sufficient velocity to force the catalyst into random motion and to expand the volume of the catalyst bed to greater than the static volume. The mixture of feedstock, gas and catalyst constitutes a turbulent zone wherein catalytic reaction takes place. The upper portion of the turbulent zone is defined by a substantially solids free zone. Liquid is recycled from the solids free zone to the lower end of the turbulent zone. Treated hydrocarbon is removed from the upper portion of the vessel.

The improvement to the ebullated bed process of the invention comprises separating gas from recycled liquid by means of a hydroclone. A successful separation as distinguished from U.S. Pat. No. 3,677,716 to Weber et al. is achieved by maintaining a hydroclone inlet head of at least 5 psi and a pressure differential from the inlet to the liquid outlet of at least 5 psi.

Gas is removed from recycled liquid and a steady state, continuous process achieved thereby.

DESCRIPTION OF THE PREFERRED EMBODIMENTS

While the invention is applicable to any process of chemically reacting liquid and gasiform materials in the presence of an expanded volume of solid contact particles, the invention will be described with particular reference to upgrading of heavy oil, as generally disclosed in U.S. Pat. No. Re 25,770.

The reactor vessel is divided into two parts, a lower turbulent reaction zone and an upper phase separation zone. The feed liquid and gas are introduced into the lower end of the reaction zone, which contains a bed of solid catalyst. Feed rises uniformly through the reaction zone, thereby expanding the catalyst mass to form what is called an ebullated bed. Liquid and gas pass to the phase separation zone which contains a hydroclone for improved liquid-vapor separation. This hydroclone provides effective separation of the vapor and gas portion of the rising liquid-gas mixture, so that a substantially vapor-free liquid portion can be collected and returned through a downcomer conduit to a recirculating means such as a pump for recycling liquid through the ebullated bed reaction zone in order to maintain the desired ebullated bed expansion.

Applicant has identified loss of recycle pump flow as the cause of the loss of ebullated bed expansion and disruption of the steady state process. Loss of pump flow has been found to be caused by gas entrainment in the pump suction liquid. The existence of this entrained gas was known to Chervenak et al. (U.S. Pat. No. 4,221,653). The patent states at Col. 9, line 35 that by means of the improvement the recycled liquid contained less than 8% gas by volume. Previous to the Chervenak et al. apparatus, recycle liquid had contained up to 20% gas by volume.

Recycle pump instability measured by oscillations in the indicated flow rate has been found to become severe as gas rate to the reactor was increased. Conversely, when the gas rate was reduced, oscillations in the flow rate subsided, indicating the pump had stabilized. The gas entrainment and loss of pump suction has been overcome in industrial practice by limiting the superficial gas velocity to below the design rate. The actual reduction required in gas rate to stabilize the pump was found to be small. It has been hypothesized that increased gas flow chokes the tubes of the tubular cup cause a sudden drop-off in separation efficiency. This hypothesized choking is thought to be a transition from bubble flow to slug flow. (*Flow Patterns for Steady Upward Gas-Liquid Flow in Vertical Tubes,* Taitel, Bornea and Dukler, AICHE Design Institute for Multiphase Processing Vol. VVFP-1.) Bubble flow is a uniform distribution of discrete bubbles through a continuous liquid. In slug flow the tube diameter is filled alternately with liquid and bullet shaped vapor. Hydroclones are not subject to such a drop-off in efficiency with gas rate. The surface tension of the hydrocarbon liquid does not permit bubbles large enough to disrupt the efficiency of a hydroclone.

This invention is shown by way of example.

EXAMPLE 1

Hydrocyclone gas removal efficiency is defined as the difference in gas concentration in the reactor liquid and the gas concentration in the downcomer divided by the concentration in the reactor liquid. In a test, a hydroclone was compared with the tubular cup of the Chervenak et al. patent for gas removal efficiency. The two sets of test data are plotted on FIG. 4.

The data shows that a hydroclone removes all of the gas from reactor liquid over the range of gas velocities experienced in an industrial ebullated bed reactor. As previously discussed, superficial gas velocity is a limiting parameter in an ebullated bed process. The tubular cup suddenly lost efficiency at superficial gas velocities above 0.15 ft/sec. This is consistent with the transition from bubble to slug flow. The FIG. 4 data were taken at a constant ebullation flow rate of about 1 ft/sec. Increasing ebullation flow rate caused the tubular cup to lose efficiency more rapidly. In contrast, the hydroclone was operationally stable and relatively insensitive to increases in ebullation flow rate.

Scale model flow tests were conducted using a hydroclone to determine the conditions for removing all entrained gas from the hydrocarbon liquid. During these tests the density of the gas-liquid fluid entering the hydroclone varied as is the case in industrial practice, causing a variation in both the inlet head and the pressure drop across the hydroclone.

The first test was conducted at a 4.75 psi separation chamber inlet pressure $P_{54}$ and a pressure drop of 5.4 psi $(P_{54}-P_{65})$ across the hydroclone. During this test the gas in hydrocarbon liquid was reduced from 35% at the separation chamber inlet 54 to 0% at the liquid outlet 65. No flow oscillation was observed. In a second test, the separation chamber inlet pressure $P_{54}$ was 4.29 psi and the pressure drop $(P_{54}-P_{65})$ was 2.8 psi. Under these conditions, the fluid flow oscillated with a vortex dipping down into the liquid outlet 65. When the vortex reached the liquid outlet 65, it broke and no separation of gas and liquid occurred until a vortex was reestablished. The oscillation frequency was 0.2 cycle per second. The flow oscillation caused the gas separation efficiency to drop off to almost zero.

Comparing the two tests, the separation chamber inlet pressure $P_{54}$ was about the same, 4.75 versus 4.29 psig, while the pressure drop ($P_{54}$ to $P_{65}$) was reduced from 5.4 to 2.8 psig. The lower pressure drop caused the loss of separation efficiency by reducing the driving force of gas through the liquid and into the gas core of the hydroclone. The vortex oscillation reduced the pressure gradient in the hydroclone to zero. Additional tests confirmed that the separation chamber inlet pressure $P_{54}$ must be maintained at least 5.0 psig and preferably greater than 5 psig to provide the driving force ($P_{54}$ to $P_{65}$) for gas through the liquid. To eliminate the vortex pulsations, the hydroclone length must be sufficient for the number of spirals $N_s$ to give the required removal efficiency. The number of spirals $N_s$ is the number of times the liquid and gas rotate around the circumference of the hydroclone separation chamber before reaching the turnaround point of the vortex. The $N_s$ is increased by increasing the inlet velocity. For a constant flow rate, the $N_s$ is directly proportional to the length of the hydroclone for a given inlet diameter and height and a given separation chamber diameter $D_b$.

EXAMPLE II

A hydroclone was designed for liquid-gas separation in a high pressure ebullated catalyst bed reactor.

The pressure drop calculations to design the hydroclone built were according to *API Manual of Refinery Wastes,* Vol. Atmospheric Emissions, Chapter 11, May 1975 (API Pub. 931).

The design parameters of the hydroclone built are shown in FIGS. 3a and 3b, and were calculated according to the following set of equations:

$$D_b = 3.18 * (R/V_i)^{0.5}$$

$$D_o = 0.5 * D_b = D_u$$

$$W = 0.25 * D_b$$

$$h_i = 0.8 * PI/4 * D_o^2/W = 0.2 * PI * D_b$$

$$h_d = 1.1 * h_i$$

$$h_b = 2.6 * D_b$$

$$h_c = (D_b - D_u)/2 * (\tan 80°) + h_b$$

$$h_v = h_c + D_b/2$$

$$h_t = h_v + D_b$$

$$h_{in} = 144 * 10/Den_f$$

$$h_o = h_{in} + 2 * D_o$$

WHERE:
- h=height, ft.
- W=width, ft.
- D=diameter, ft.
- Den=density, lb/cu ft.
- PI=3.14
- R=liquid+gas rate, cubic ft./sec.
- V=maximum design velocity, ft./sec.

SUBSCRIPTS
- o=vapor outlet
- b=separation chamber
- d=draft tube
- c=cone
- v=top of vortex breaker
- t=bottom of vortex breaker
- in=inlet line
- f=fluid (gas +liquid)
- i=inlet line at intersection with hydroclone body
- u=liquid outlet

| DESIGN CONDITIONS | |
| --- | --- |
| Temperature, °F. | 800 |
| Pressure, psig | 2900 |
| Liquid + Gas Flow Rate, bbl./hr. | 4000 |
| Inlet Gas Content, Vol % | 40 |
| Inlet Gas Density, lb./cu. ft. | 4.5 |
| Liquid Density, lb./cu. ft. | 37 |
| Required Gas Free Ebullation Liquid, bbl./hr. | 2400 |

The following design constraints were used based on scale model flow tests.

| DESIGN CONSTRAINTS | |
| --- | --- |
| $V_{54}$ max, Maximum Inlet Velocity at 54, ft/sec. | 10 |
| $N_s$, Minimum Number of Spirals | 1.2 |
| $P_{54}$, Minimum, psi | 5.0 |
| ($P_{54}$-$P_{65}$), Minimum Pressure Drop, psi | 5.0 |

The calculations were done according to a trial-and-error method using the design conditions and constraints and the sizing equation described herein. The hydroclone body diameter $D_b$ was calculated using the liquid and gas flow rate R, and the maximum inlet velocity at point 54, $V_{54}$ max. All of the remaining dimensions are determined from the hydroclone body diameter. Using the calculated hydroclone dimensions, design conditions and experimentally determined pressure drop calculations the pressure drop was checked to make sure it was at least 5 psig. If the pressure drop ($P_{54}$ to $P_{65}$) were less than 5 psig, the procedure would be repeated using a higher hydroclone inlet velocity, $V_{54}$. The relationship between $V_{54}$ and $P_{54}$ is shown in FIG. 5.

Using the design conditions and constraints, the hydroclone dimensions were:

| | |
| --- | --- |
| $D_b$ | 48 in |
| $D_o$ | 24 in |
| W | 12 in |
| $h_b$ | 125 in |
| $h_i$ | 30 in |
| $h_d$ | 33 in |
| $h_c$ | 193 in |
| $h_v$ | 217 in |
| $h_t$ | 265 in |
| $h_{in}$ | 60 in |
| $h_o$ | 156 in |

This design provides a gas free liquid for the ebullation of the catalyst bed.

While particular embodiments of the invention have been described, it is well understood that the invention is not limited thereto since modifications may be made. For example the use of multiple hydroclones in series or in parallel is envisioned. Also, the term fluent hydrocarbon comprises liquid hydrocarbons as well as slurried coal. It is therefore contemplated to cover by the appended claims any such modifications as fall within the spirit and scope of the claims.

What is claimed is:

1. In a continuous process for treating a fluent hydrocarbon feedstock with a hydrogen-containing gas at elevated catalytic reaction temperatures and pressures in the presence of a bed of particulate solid catalyst, comprising introducing the hydrogen-containing gas and feedstock into the lower end of a generally vertical reaction vessel containing catalyst at sufficient velocity whereby the catalyst is placed in random motion within the fluent hydrocarbon and is expanded to a volume greater than its static volume, wherein the mixture of feedstock, gas and catalyst constitutes a turbulent zone, the upper portion of which is defined by a substantially catalyst free zone wherein liquid is recycled from the catalyst free zone to the lower end of the turbulent zone by pump means and hydrocarbon is removed from the substantially catalyst free zone, the improvement which comprises:

(a) passing liquid from said catalyst free zone to the inlet of a hydroclone submerged in said zones to provide an inlet head of at least 5 psi, (b) maintaining a differential pressure of at least 5 psi between the inlet and a hydroclone liquid outlet in direct fluid communication with the suction of said pump means.

* * * * *